(12) United States Patent
Lee et al.

(10) Patent No.: US 11,690,105 B2
(45) Date of Patent: *Jun. 27, 2023

(54) RANDOM ACCESS PERFORMING METHOD, AND DEVICE SUPPORTING SAME

(71) Applicant: LG ELECTRONICS INC., Seoul (KR)

(72) Inventors: Youngdae Lee, Seoul (KR); Sunyoung Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/498,139

(22) Filed: Oct. 11, 2021

(65) Prior Publication Data

US 2022/0030637 A1 Jan. 27, 2022

Related U.S. Application Data

(63) Continuation of application No. 16/608,736, filed as application No. PCT/KR2018/004941 on Apr. 27, 2018, now Pat. No. 11,166,320.

(60) Provisional application No. 62/491,369, filed on Apr. 28, 2017.

(51) Int. Cl.
*H04W 4/00* (2018.01)
*H04W 74/08* (2009.01)
*H04W 36/30* (2009.01)

(52) U.S. Cl.
CPC ....... *H04W 74/0833* (2013.01); *H04W 36/30* (2013.01)

(58) Field of Classification Search
CPC . H04W 74/0833; H04W 36/30; H04W 36/06; H04W 16/28

USPC ......................................................... 370/331
See application file for complete search history.

(56) References Cited

U.S. PATENT DOCUMENTS

| | | | | |
|---|---|---|---|---|
| 7,471,654 | B2* | 12/2008 | Mueckenheim | H04W 72/0486 370/341 |
| 7,986,946 | B2* | 7/2011 | Pettersson | H04W 24/08 370/335 |
| 8,588,193 | B1* | 11/2013 | Ho | H04B 7/0617 370/329 |
| 9,872,296 | B2* | 1/2018 | Raghavan | H04W 72/085 |
| 10,187,881 | B2* | 1/2019 | Xu | H04W 72/042 |
| 10,547,365 | B2* | 1/2020 | Teslenko | G08G 1/123 |
| 10,548,067 | B2* | 1/2020 | Kim | H04W 52/365 |
| 10,700,752 | B2* | 6/2020 | Jung | H04B 7/0695 |
| 11,166,320 | B2* | 11/2021 | Lee | H04W 74/0833 |
| 11,178,695 | B2* | 11/2021 | Jeong | H04B 7/0695 |

(Continued)

FOREIGN PATENT DOCUMENTS

| KR | 10-2015-0000304 A | 1/2015 |
|---|---|---|
| KR | 10-2015-0132200 | 11/2015 |
| WO | 2017/022112 A1 | 2/2017 |

*Primary Examiner* — Amancio Gonzalez
(74) *Attorney, Agent, or Firm* — Dentons US LLP

(57) ABSTRACT

Provided is a method for performing a random access procedure by a terminal in a wireless communication system. The method comprises the steps of: selecting a first beam having a quality equal to or higher than a preconfigured threshold value; transmitting a random access preamble to a base station via the first beam; adjusting the threshold value when it is determined that the random access procedure has failed; and reselecting a second beam having a quality equal to or higher than the adjusted threshold value.

13 Claims, 13 Drawing Sheets

(56) References Cited

U.S. PATENT DOCUMENTS

| | | | |
|---|---|---|---|
| 2010/0032587 A1* | 2/2010 | Hosch | H01J 37/32972 250/493.1 |
| 2012/0106346 A1* | 5/2012 | Aguirre | H04W 28/0967 370/237 |
| 2012/0155306 A1* | 6/2012 | Kim | H04W 28/22 370/252 |
| 2013/0258885 A1* | 10/2013 | Yu | H04B 7/0632 370/252 |
| 2013/0301454 A1* | 11/2013 | Seol | H04B 7/0695 370/252 |
| 2015/0103770 A1* | 4/2015 | Chang | H04W 24/10 370/329 |
| 2015/0222345 A1* | 8/2015 | Chapman | H04W 36/30 370/332 |
| 2016/0099763 A1 | 4/2016 | Chen | |
| 2016/0183233 A1* | 6/2016 | Park | H04W 36/0072 370/329 |
| 2016/0192358 A1 | 6/2016 | Lee et al. | |
| 2016/0192433 A1* | 6/2016 | Deenoo | H04W 24/08 370/329 |
| 2016/0353510 A1* | 12/2016 | Zhang | H04B 7/0617 |
| 2018/0041949 A1* | 2/2018 | Liu | H04W 48/16 |
| 2018/0219604 A1* | 8/2018 | Lu | H04B 7/088 |
| 2020/0052754 A1* | 2/2020 | Jung | H04L 1/0003 |

* cited by examiner

RANDOM ACCESS PERFORMING METHOD, AND DEVICE SUPPORTING SAME

This application is a continuation of U.S. application Ser. No. 16/608,736, filed Oct. 25, 2019, which is the National Stage filing of International Application No. PCT/KR2018/004941, filed on Apr. 27, 2018, which claims the benefit of U.S. Provisional Application No. 62/491,369 filed on Apr. 28, 2017, the contents of which are all hereby incorporated by reference herein in their entirety.

BACKGROUND OF THE DISCLOSURE

Field of the Disclosure

The disclosure relates to a technique for performing a random access procedure using a beam in NR.

Related Art

In order to meet the demand for wireless data traffic, which has been increasing since the commercialization of a 4th-generation (4G) communication system, there are ongoing efforts to develop enhanced 5th generation (5G) communication systems or pre-5G communication systems. For the reasons, the 5G communication system or pre-5G communication system is called a beyond-4G network communication system or a post-long-term evolution (LTE) system. To achieve a high data transmission rate, it is considered to implement a superhigh frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), full-dimensional MIMO (FD-MIMO), array antenna, analog beamforming, and large scale antenna techniques are discussed in the 5G communication system.

Further, to improve the network of the system, technical development for implementation of an evolved small cell, an advanced small cell, a cloud radio access network (cloud RAN), an ultra-dense network, device-to-device (D2D) communication, wireless backhaul, a moving network, cooperative communication, coordinated multi-points (CoMP), and reception interference cancellation in 5G communication systems is progressing.

In addition, advanced coding modulation (ACM) schemes including hybrid FSK and QAM (FQAM) and sliding window superposition coding (SWSC) as well as advanced access techniques including filter bank multi-carrier (FBMC), non-orthogonal multiple access (NOMA), and sparse code multiple access (SCMA) are being developed for implementation in 5G systems.

Furthermore, an extremely high frequency band is being considered to achieve a high data transmission rate, and beamforming technology is under discussion to alleviate the path loss of radio signals and to increase the transmission distance of radio signals in an extremely high frequency band.

SUMMARY OF THE DISCLOSURE

In NR, a UE may use a beam to perform a random access procedure. Specifically, the UE may select a beam for transmitting a random access preamble or an RRC connection request message. Here, it is important to select a proper beam for quickly and successfully performing the random access procedure.

According to an embodiment of the disclosure, there is provided a method for performing a random access procedure in a wireless communication system, the method including: selecting a first beam having a quality of a preset threshold value or higher; transmitting a random access preamble to a base station through the first beam; adjusting the threshold value when it is determined that the random access procedure fails; and reselecting a second beam having a quality of the adjusted threshold value or higher.

The method may further include transmitting the random access preamble to the base station through the second beam.

It may be determined that the random access procedure fails either when a response to the random access preamble is not received while the random access preamble is transmitted a set number of times or when it is determined that contention resolution is not successfully performed.

The threshold value may be a reference signal received power (RSRP) value or a reference signal received quality (RSRQ) value.

When the response to the random access preamble is not received, the adjusting of the threshold value may adjust the threshold value by reducing the threshold value.

The method may further include receiving information about an adjustment interval for the threshold value from the base station, wherein the adjusting of the threshold value adjusts the threshold value by the adjustment interval.

The base station may correspond to a base station of a target cell for handover.

According to another embodiment of the disclosure, there is provided a user equipment (UE) for performing a random access procedure in a wireless communication system, the UE including: a memory; a transceiver; and a processor to connect the memory and the transceiver, wherein the processor is configured to: select a first beam having a quality of a preset threshold value or higher; transmit a random access preamble to a base station through the first beam; adjust the threshold value when it is determined that the random access procedure fails; and reselect a second beam having a quality of the adjusted threshold value or higher.

The processor may be configured to transmit the random access preamble to the base station through the second beam.

It may be determined that the random access procedure fails either when a response to the random access preamble is not received while the random access preamble is transmitted a set number of times or when it is determined that contention resolution is not successfully performed.

The threshold value may be a reference signal received power (RSRP) value or a reference signal received quality (RSRQ) value.

When the response to the random access preamble is not received, the processor may be configured to adjust the threshold value by reducing the threshold value.

The processor may be configured to receive information about an adjustment interval for the threshold value from the base station and to adjust the threshold value by the adjustment interval.

The base station may correspond to a base station of a target cell for handover.

According to an embodiment of the disclosure, when a random access procedure is delayed or fails, a beam for transmitting a random access preamble may be reselected by adjusting a threshold value, thereby quickly and successfully performing a random access procedure.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the present disclosure are not limited thereto.

Figure 1:
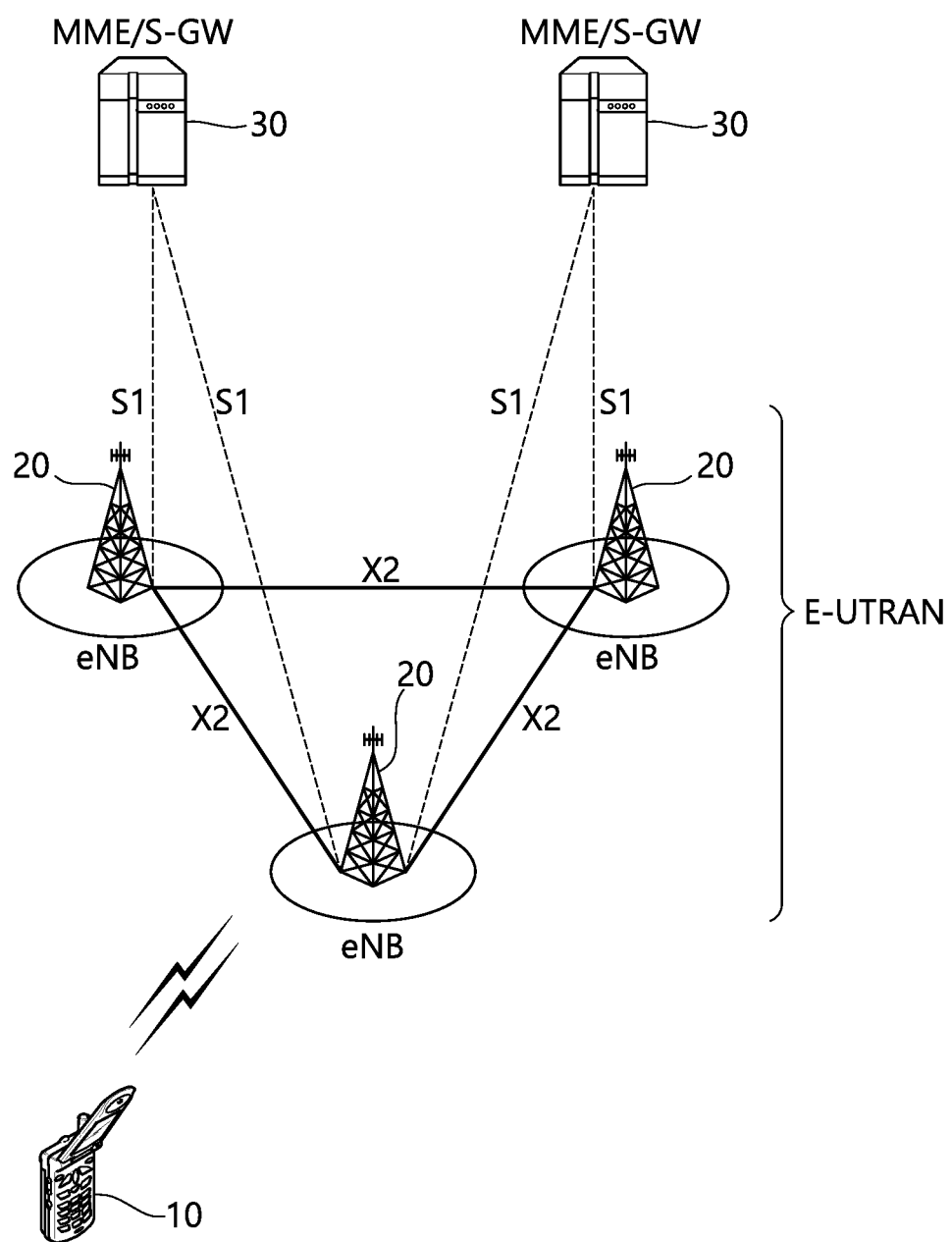
FIG. 1 shows the architecture of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
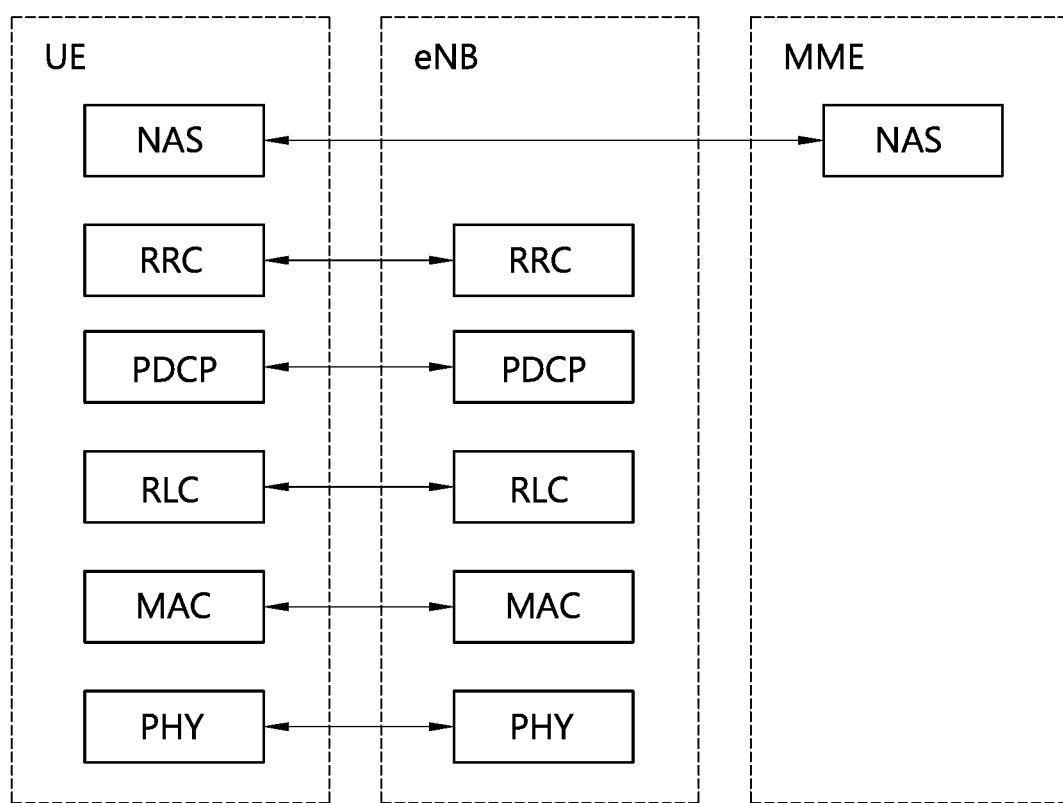
FIG. 2 shows a control plane of a radio interface protocol of an LTE system.
Figure 3:
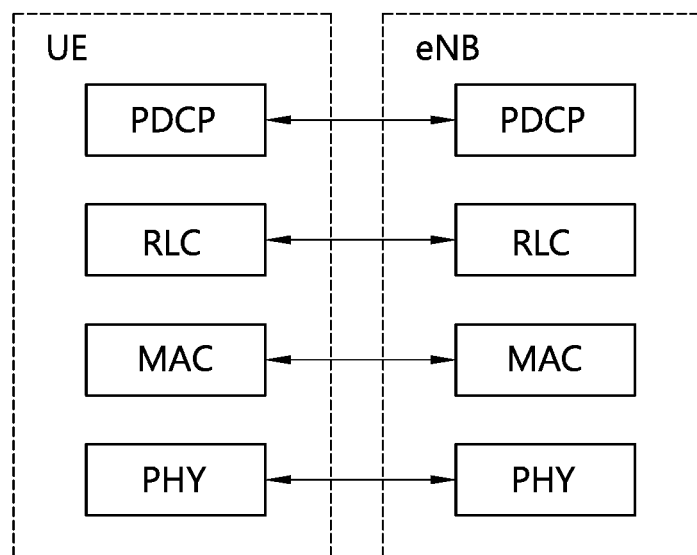
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

System information includes essential information that a UE needs to have in order to access a base station. Therefore, the UE needs to receive all system information before connecting to the base station and needs to always have updated system information. Since system information is information that all UEs in one cell need to know, a base station periodically transmits system information.

System information may be classified into a master information block (MIB), a scheduling block (SB), and a system information block (SIB). An MIB provides a UE with the physical configuration of a cell, for example, a bandwidth. An SB provides transmission information about SIBs, for example, a transmission period. An SIB includes only information about a neighboring cell, and another SIB includes only information about an uplink radio channel used by a UE.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Random access procedures may be classified into a contention-based random access procedure and a contention-free random access procedure. The contention-based random access procedure allows different UEs to simultaneously access an eNB using the same RACH preamble. Therefore, contention may occur. To deal with contention, an additional contention resolution process is necessary.

Figure 4:
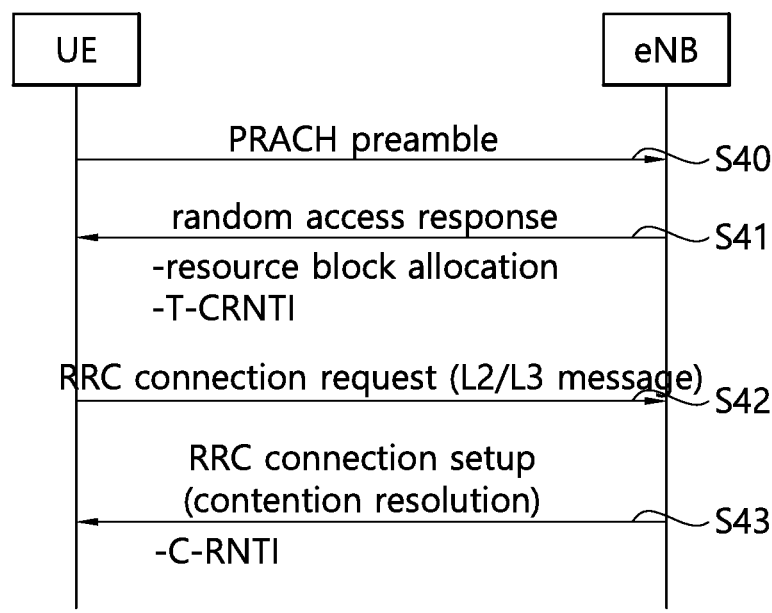
FIG. 4 shows a contention-based random access procedure.

FIG. 4 shows a contention-based random access procedure.

In operation S40, a UE transmits an RACH preamble to an eNB. The RACH preamble may be referred to as message 1. The RACH preamble may include an RA-RNTI. The RA-RNTI may be determined by 1+t_id+*f_id, where t_id is the index of a first subframe of a specified physical random access channel (PRACH) (0≤t_id<10), and f_id is the index of a specified PRACH in the subframe according to ascending order in the frequency domain (0≤f_id<6). The eNB may decode the RACH preamble, thus obtaining the RA-RNTI.

In operation S41, the eNB transmits a random access response (RAR) to the UE. The random access response may be referred to as message 2. The random access response may include the RA-RNTI obtained by the eNB decoding the RACH preamble, a TA, a temporary C-RNTI, and a resource block allocation (i.e., a UL grant for an L2/L3 message). The UE may decode the random access response, thus obtaining the resource block allocation and a modulation and coding scheme (MCS) configuration. The eNB may be configured to receive an RRC connection request message through DCI format 0.

In operation S42, the UE transmits an L2/L3 message, that is, an RRC connection request message, to the eNB. The RRC connection request message may be referred to as message 3. The UE may transmit the RRC connection request message using the temporary C-RNTI obtained from the random access response.

In operation S43, when successfully decoding the RRC connection request message transmitted from the UE, the eNB transmits an HARQ ACK to the UE. Accordingly, the UE determines that the random access procedure is successful. This process is referred to as a contention resolution process. Specifically, the eNB transmits an RRC connection setup message to the UE using the temporary C-RNTI in response to the RRC connection request message. The RRC connection setup message may be referred to as message 4. The RRC connection setup message may include a C-RNTI. Then, the UE and the eNB can exchange messages using the C-RNTI.

If the UE fails to receive the HARQ ACK, the UE goes back to S40 and may transmit an RACH preamble o the eNB.

In the contention-free random access procedure, contention is not allowed due to timing constraints. An eNB may indicate when each UE transmits which RACH preamble. To this end, the UE needs to be in a connected state (RRC_CONNECTED) before the random access procedure. For example, the contention-free random access procedure may be performed during handover. In the contention-free random access procedure, the eNB transmits an RACH preamble allocation to the UE. The UE transmits an RACH preamble including an RA-RNTI and an indication about the size of an L2/L3 message to the eNB according to the received RACH preamble allocation. Upon receiving the RACH preamble, the eNB transmits a random access response including a timing advance (TA), a C-RNTI, and a UL grant for an L2/L3 message to the UE. Accordingly, the contention-free random access procedure may be completed.

A UE performs a random access procedure 1) when the UE has no connection (RRC connection) with a base station and thus performs initial access, 2) when the UE first accesses a target cell in a handover process, 3) upon request via a command from a base station, 4) when there is uplink data with uplink time asynchronous or with a designated radio resource, used to request a radio resource, not allocated, 5) in a recovery process due to radio link failure or handover failure.

Hereinafter, a 5G network structure is described.

Figure 5:
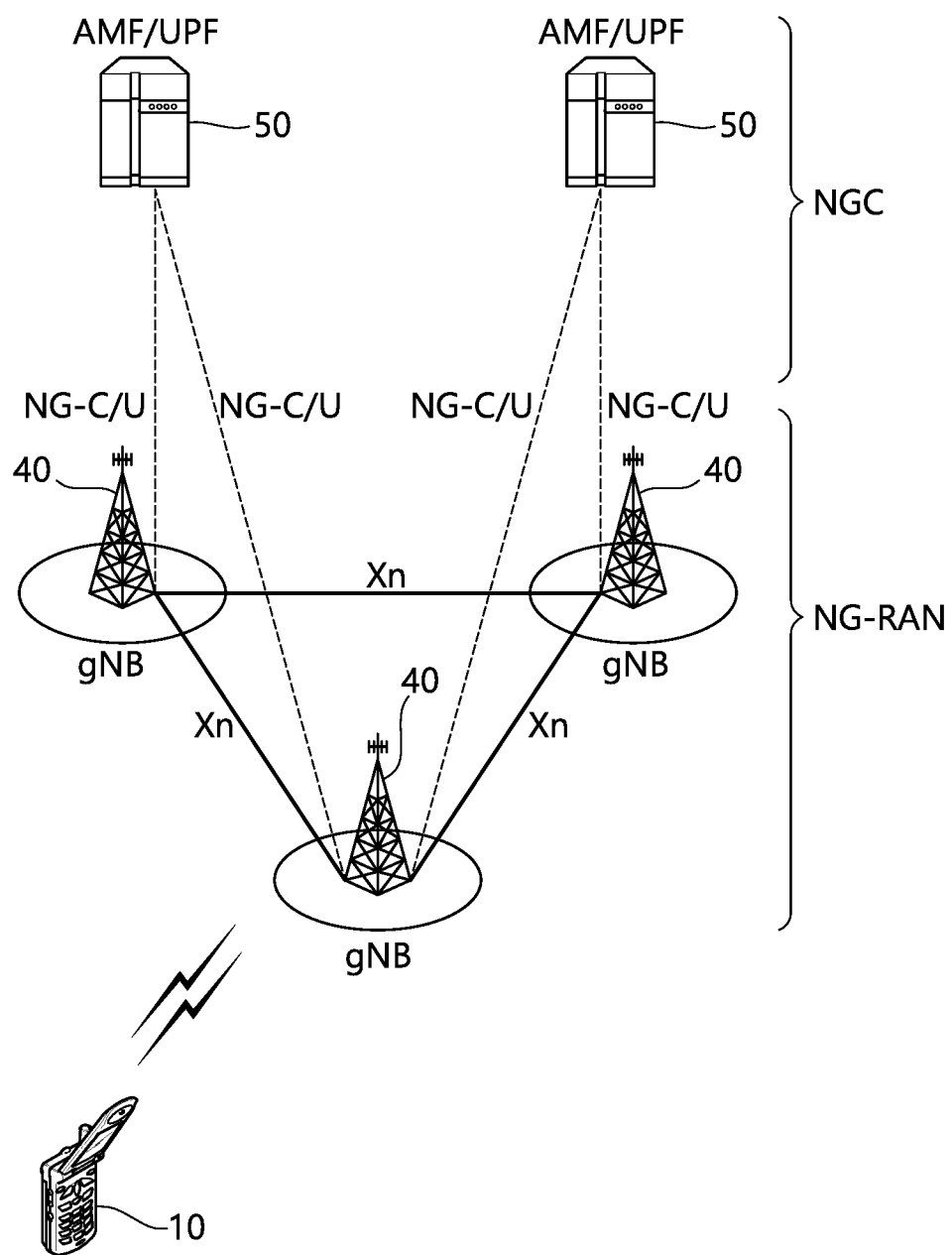
FIG. 5 shows a structure of a 5G system.

FIG. 5 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 5, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

Hereinafter, beamforming will be described.

A beamforming technology using multiple antennas may be broadly divided into an analog beamforming technology (hereinafter, "analog beamforming") and a digital beamforming technology (hereinafter, "digital beamforming") depending on where a beamforming weight vector or precoding vector is applied.

Figure 6:
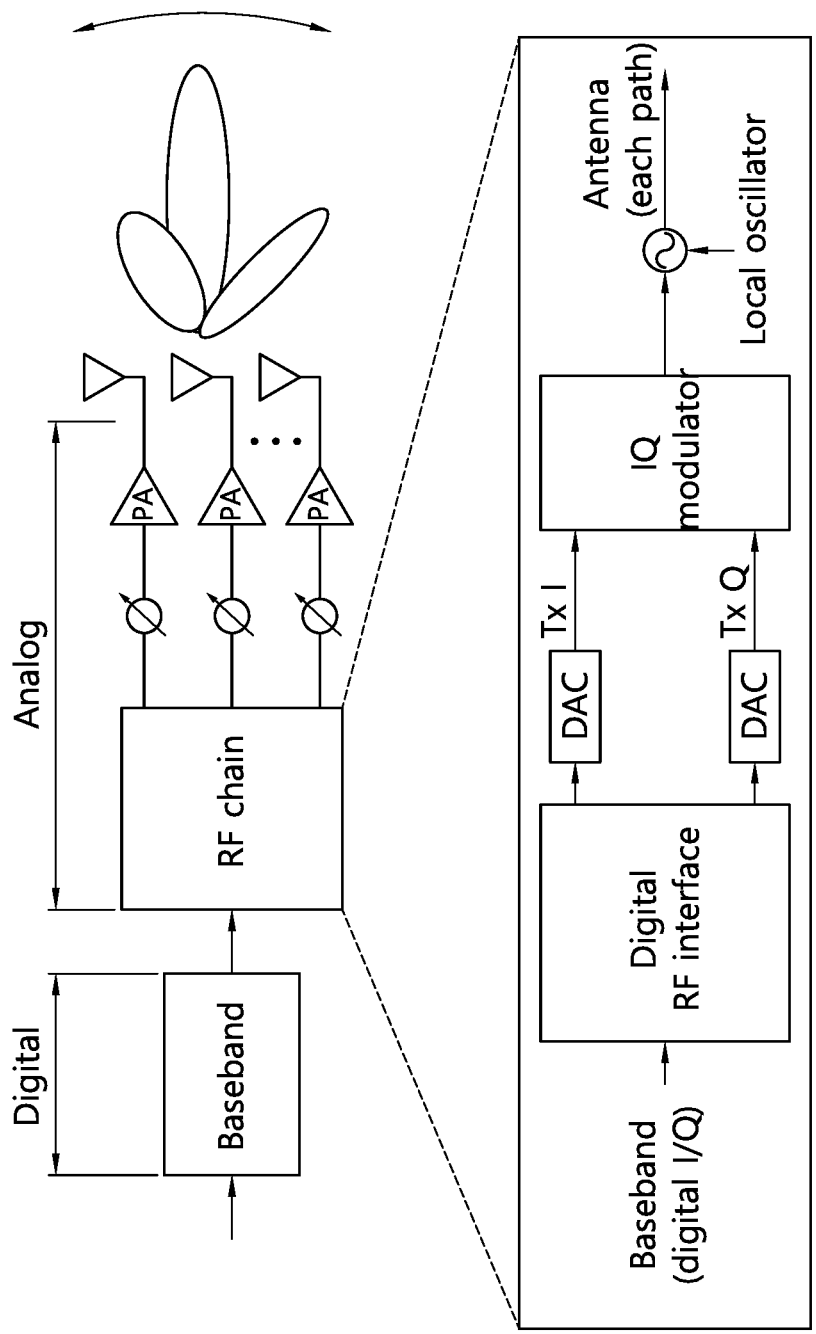
FIG. 6 shows an example of analog beamforming.

FIG. 6 shows an example of analog beamforming.

The analog beamforming is a typical beamforming technique applied to earlier multi-antenna structures. In the analog beamforming, a beam is formed by partitioning an analog signal, produced by digital signal processing, into a plurality of paths and configuring phase shift (PS) and power amplifier (PA) settings for each path. Referring to FIG. 6, in the analog beamforming, an analog signal derived from a single digital signal is processed by the PS and PA connected to each antenna. That is, the PS and the PA handle a complex weight in an analog stage. Herein, an RF chain refers to a processing block that converts a baseband signal into an analog signal. In the analog beamforming, beam precision is determined by characteristics of elements of the PS and PA, and is advantageous for narrowband transmission according to control characteristics of the elements. Meanwhile, a hardware structure makes it difficult to implement multi-stream transmission, thus making a multiplexing gain for higher data rates relatively small and making it difficult to form a beam per user based on orthogonal resource allocation.

Figure 7:
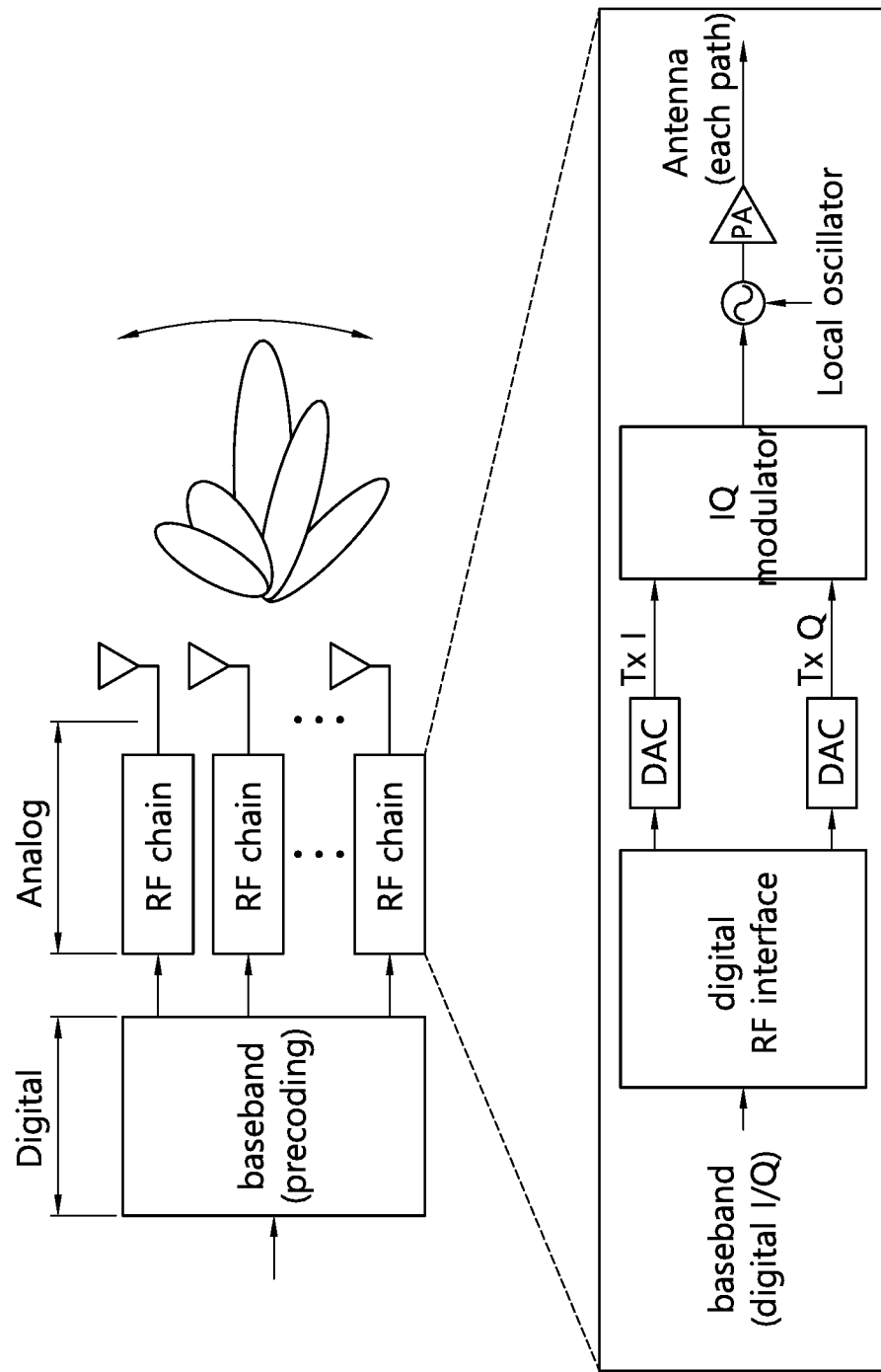
FIG. 7 shows an example of digital beamforming.

FIG. 7 shows an example of digital beamforming.

The digital beamforming differs from the analog beamforming in that a beam is formed in a digital stage by using baseband processing to maximize diversity and multiplexing gain in a MIMO environment. Referring to FIG. 7, the beam may be formed by performing precoding in the baseband processing. An RF chain may include a PA. Accordingly, a complex weight derived for beamforming may be directly applied to transmitted data. The digital beamforming may support simultaneous multi-user beamforming because a different beam may be formed for each user. Moreover, the digital beamforming allows for forming an independent beam for each user to whom an orthogonal resource is allocated, thus providing high scheduling flexibility and enabling to operate the transmitting end according to a system purpose. In addition, the digital beamforming allows for forming an independent beam per subcarrier when a technology such as MIMO-OFDM is used in a broadband transmission environment. Thus, the digital beamforming may optimize a maximum data rate of a single user on the basis of increased system capacity and enhanced beam gain. Therefore, digital beamforming-based MIMO technology was adopted to 3G/4G systems.

Meanwhile, a massive multiple-input multiple-output (MIMO) environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in the massive MIMO environment. When conventional digital beamforming is used in the massive MIMO environment, since digital signal processing should be performed for hundreds of transmit antennas through baseband processing, the complexity of signal processing increases considerably, and since as many RF chains as the number of transmit antennas are required, the complexity of hardware implementation increases considerably. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in the massive MIMO environment, the hardware complexity at a transmitting end is relatively low, but the performance increase through the use of a plurality of antennas is only slight and flexibility of resource allocation is reduced. In particular, in broadband transmission, it is very hard to perform beam control for each frequency.

Accordingly, the massive MIMO environment requires hybrid beamforming, which is a combination of the analog beamforming and the digital beamforming, rather than using either the analog beamforming or the digital beamforming as a beamforming technology. That is, a hybrid-type transmitting end structure may be needed so as to lower the complexity of hardware implementation at the transmitting end according to characteristics of the analog beamforming and to maximize a beamforming gain using a large number of transmit antennas according to characteristics of the digital beamforming.

Figure 8:
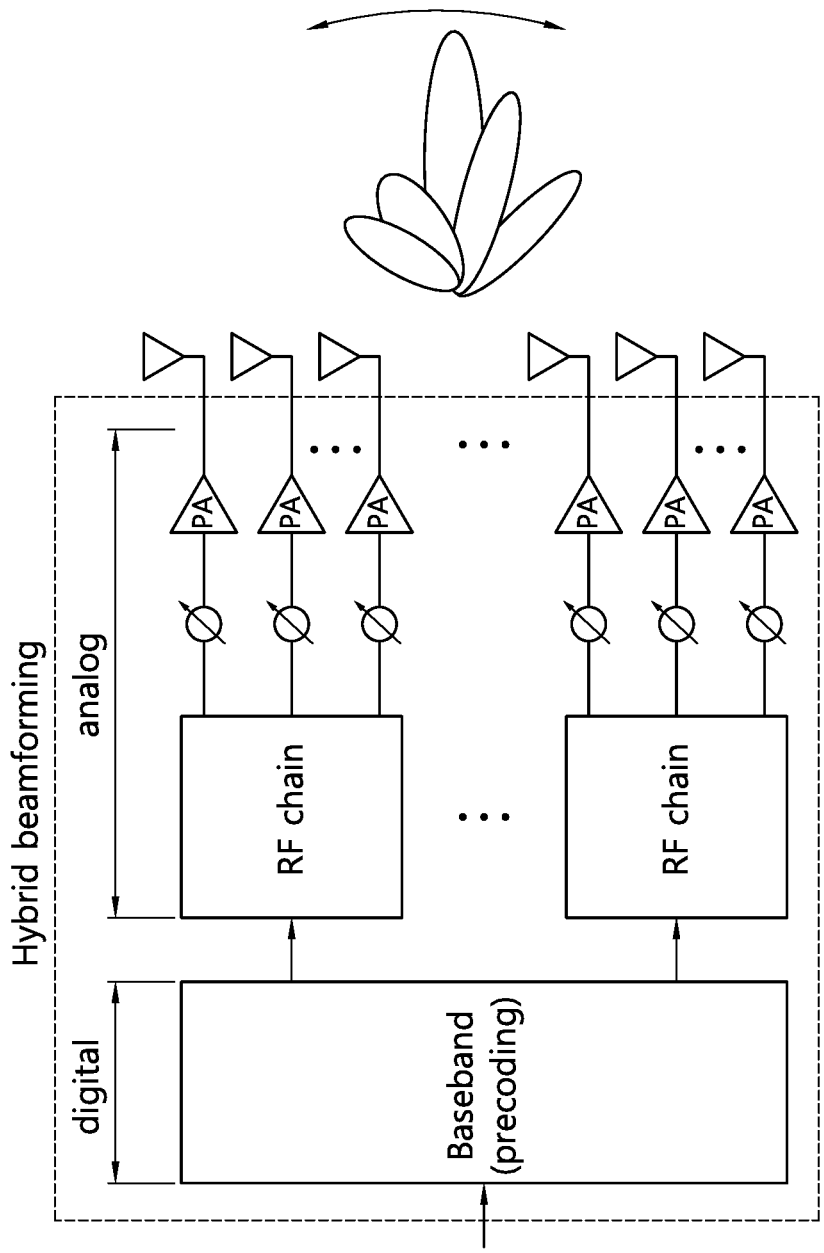
FIG. 8 shows an example of hybrid beamforming.

FIG. 8 shows an example of hybrid beamforming.

As described above, the hybrid beamforming is aimed at configuring a transmitting end capable of taking advantages of analog beamforming and digital beamforming in a large MIMO environment. Referring to FIG. 8, the hybrid beamforming basically forms a coarse beam through the analog beamforming and forms a beam for multiple streams or multi-user transmission through the digital beamforming. That is, the hybrid beamforming may have a structure for simultaneously taking the analog beamforming and the digital beamforming in order to lower the implementation complexity or the hardware complexity of the transmitting end.

In order to achieve a high data rate, a super high frequency (millimeter wave (mmW)) band is considered in a new RAT. Since the super high frequency band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breadth of 5 cm and a length of 5 cm. If the plurality of antenna elements are used in the super high frequency band, the coverage can be increased and the throughput can be improved by the increase of the beamforming gain.

In NR, a UE may use a beam to perform a random access procedure. Specifically, the UE may select a beam for transmitting message 1 (i.e., a random access preamble) or message 3 (i.e., a PUSCH or an RRC connection request message in response to a random access response). Here, it is important to select a proper beam for quickly and successfully performing the random access procedure Hereinafter, a method of performing a random access procedure according to an embodiment of the disclosure is described. According to an embodiment of the disclosure, a UE may select one or more beams having a quality of a threshold value or higher and may attempt access using one or more random access preambles via the selected beams. That is, the UE may attempt access by transmitting a random access preamble. The UE may transmit the random access preamble a predetermined number of times until the UE receives a random access response in response to the random access preamble or until the UE determines that conflict resolution (or contention resolution) is successful. Successful contention resolution means that the base station successfully decodes an RRC connection request message received from the UE and properly performs a series of processes of transmitting an HARQ ACK (i.e., message 4) to the UE.

In one example, a random access procedure may be initiated when a UE first accesses a target cell in a handover process. The random access procedure may be classified as a contention-free random access procedure or a contention-based random access procedure. In a contention-free random access procedure, a base station may indicate when each UE transmits which random access preamble via which beam. In the contention-free random access procedure, a beam indicated by the base station may be determined on the basis of the result of a UE measuring a target cell in a source cell. However, in the contention-free random access procedure, it is not guaranteed whether the beam indicated by the base station still has the best quality when the UE moves to the target cell, that is, even after a certain period of time since the measurement of the target cell. In this case, as the contention-free random access procedure is not properly performed, the random access procedure may be switched to a contention-based random access procedure. In the contention-based random access procedure, the UE may need to select a proper beam in order to transmit a random access preamble. In this example, a contention-based random access procedure may also be initiated from the beginning in a handover procedure.

If the UE transmits a random access preamble in N access attempts but fails to receive a random access response in response to the random access preamble or determines that contention resolution is not successful, the UE may adjust the threshold value. The UE may adjust the threshold value by reducing the threshold value. In addition, the UE may adjust the threshold value by increasing the threshold value. The UE may reselect one or more beams having a quality of the adjusted threshold value or higher. The UE may retransmit one or more random access preambles using the reselected beams in the next access attempt. In this case, the reselected beams may be at least partially different from the previously selected beams.

According to an embodiment of the disclosure, the UE may select one or more beams having a quality of a first threshold value or higher and may simultaneously transmit one or more random access preambles using the selected beams.

If the UE performs N access attempts but fails to receive a random access response in response to a transmitted random access preamble or determines that contention resolution is not successful, the UE may change the first threshold value to a second threshold value. That is, the UE may reselect one or more beams having a quality of the second threshold value or higher. Subsequently, the UE may simultaneously transmit one or more random access preambles using the reselected beams, thereby performing an N+1th access attempt. The UE may perform a total of N+N access attempts until receiving a random access response in response to a transmitted random access preamble or determining that contention resolution is successfully achieved.

In the disclosure, N may be signaled by the base station (gNB or eNB) and may be an integer of 1 or greater. The first threshold value and/or the second threshold value and the difference between the first threshold value and the second threshold value may be signaled by the base station. The first threshold value may be greater than the second threshold value.

According to an embodiment of the disclosure, the UE may set a counter to 1. Further, the UE may select one or more beams by the following methods.

Option 1: The UE may select one or more beams having a quality (i.e., RSRP or RSRQ) of a threshold value or higher.

Option 2: The UE may select N beams with high quality. Here, the number N of beams may be signaled by the base station.

Subsequently, the UE may transmit a random access preamble using the one or more selected beams, thereby performing an access attempt. When a plurality of beams is selected, the UE may transmit a random access preamble using each beam once or more times. However, there is no particular limitation on a method for determining the number of times each beam is used and the order in which the beams are used.

Whenever the UE fails to receive a random access response in response to the transmitted random access preamble or determines that contention resolution is not successful, the UE may increase the counter by 1 and may transmit one or more random access preambles using the beam selected in the access attempt.

When the counter reaches M, the UE may reselect one or more beams by the following methods. That is, M indicates the number of times the UE transmits a random access preamble using the selected beam.

Option 1: The UE may adjust the threshold value and may reselect one or more beams having a quality (i.e., RSRP or RSRQ) of the adjusted threshold value or higher. Specifically, the UE may adjust the threshold value by reducing or increasing the threshold value according to configuration information received from the base station.

Option 2: The UE may reselect N beams having high quality. The number N of beams is 1 or greater and may be indicated by the base station.

Subsequently, the UE may reset the counter to 1 and may transmit one or more random access preambles using the reselected beams, thereby performing an access attempt. In this case, the reselected beams may be at least partially different from the previously selected beams.

Likewise, whenever the UE fails to receive a random access response in response to the transmitted random access preamble or determines that contention resolution is not successful, the UE may increase the counter by 1 and may transmit one or more random access preambles using the beam selected in the access attempt.

When the counter reaches M again, as described above, the UE may reselect one or more beams, may reset the counter to 1, and may transmit one or more random access preambles using the reselected beams, thereby performing an access attempt.

Hereinafter, a method of performing a random access procedure according to an embodiment of the disclosure will be described with reference to FIG. 9. In this embodiment, a UE may measure an RSRP or RSRQ in a serving cell.

In operation S902, the UE may receive RACH configuration information associated with a beam from a network. The RACH configuration information may include information about a threshold value used to select a beam. In this embodiment, the threshold value may be a reference signal received power (RSRP) value or a reference signal received quality (RSRQ) value. Specifically, an RRC layer of the UE may receive the RACH configuration information, and an MAC layer of the UE may configure an RACH. The UE may set a plurality of threshold values on the basis of the RACH configuration information received from a base station.

In operation S904, the UE may select a beam corresponding to an RSRP or RSRQ of the highest threshold value or higher among RSRPs or RSRQs measured in the serving cell. When there is a plurality of beams having a quality of the threshold value or higher, the UE may select one or more beams from among the plurality of beams. For example, the UE may select one or more beams in order of excellent quality among the beams having a quality of the threshold value or higher.

In operation S906, the UE may set a counter to 1. The UE may transmit a random access preamble using a physical random access channel (PRACH) resource corresponding to the selected beam. The random access preamble may include a random access preamble identifier (RAPID) for identifying the random access preamble.

In operation S908, the UE may monitor a random access response using the selected beam or the beam used to transmit the random access preamble.

In operation S910, if the UE fails to receive a random access response, the UE may transmit a random access preamble using the PRACH resource corresponding to the selected beam. In particular, when there is a plurality of selected beams, the UE may transmit a random access preamble using each beam once or more times. However, there is no particular limitation on a method for determining the number of times each beam is used and the order in which the beams are used. That is, if the UE fails to receive a random access response or contention resolution is not successful, the UE performs an access attempt by transmitting a random access preamble a set number of times (i.e., the maximum value of the counter), in which each access attempt may be performed on the basis of any one of a plurality of selected beams. Whenever the UE fails to receive a random access response in response to the transmitted random access preamble or determines that contention resolution is not successful, the UE may perform an access attempt by transmitting one or more random access preambles using the selected beam. In addition, the UE may increase the counter by 1 every time the UE transmits a random access preamble.

In operation S912, when the counter reaches the maximum value of the counter (MAX_COUNTER), the UE may adjust the RSRP or RSRQ threshold value by reselecting the second highest threshold value following the previous threshold value among the set threshold values. That is, the UE may adjust the threshold value by increasing or reducing the previous threshold value. The maximum value of the counter is an integer of 1 or greater and may be set by the base station. Subsequently, the UE may reselect a beam corresponding to an RSRP or RSRQ of the adjusted threshold value or higher among the measured RSRPs or RSRQs.

In operation S914, the UE may transmit a random access preamble using a PRACH resource corresponding to the reselected beam. The UE may reset the counter to 1.

In operation S916, the UE may monitor a random access response using the reselected beam or the beam used to transmit the random access preamble.

In operation S918, if the UE fails to receive a random access response, the UE may transmit a random access preamble again using the PRACH resources corresponding to the reselected beam. Whenever the UE fails to receive a random access response in response to the transmitted random access preamble or determines that contention resolution is not successful, the UE may perform an access attempt by transmitting one or more random access preambles using the selected beam. In addition, the UE may increase the counter by 1 every time the UE transmits a random access preamble.

In the foregoing procedure, when the UE fails to receive a random access response in response to the transmitted random access preamble or determines that contention resolution is not successful, the UE may repeat operation S912.

In operation S920, the UE may receive a random access response corresponding to the random access preamble. The random access response may include a random access preamble identifier corresponding to the random access preamble.

In operation S922, the UE may transmit message 3 using am uplink grant included in the random access response.

In operation S924, the base station may transmit message 4 indicating that contention resolution is successfully completed to the UE. Message 4 may be an RRC connection setup message.

Figure 9:
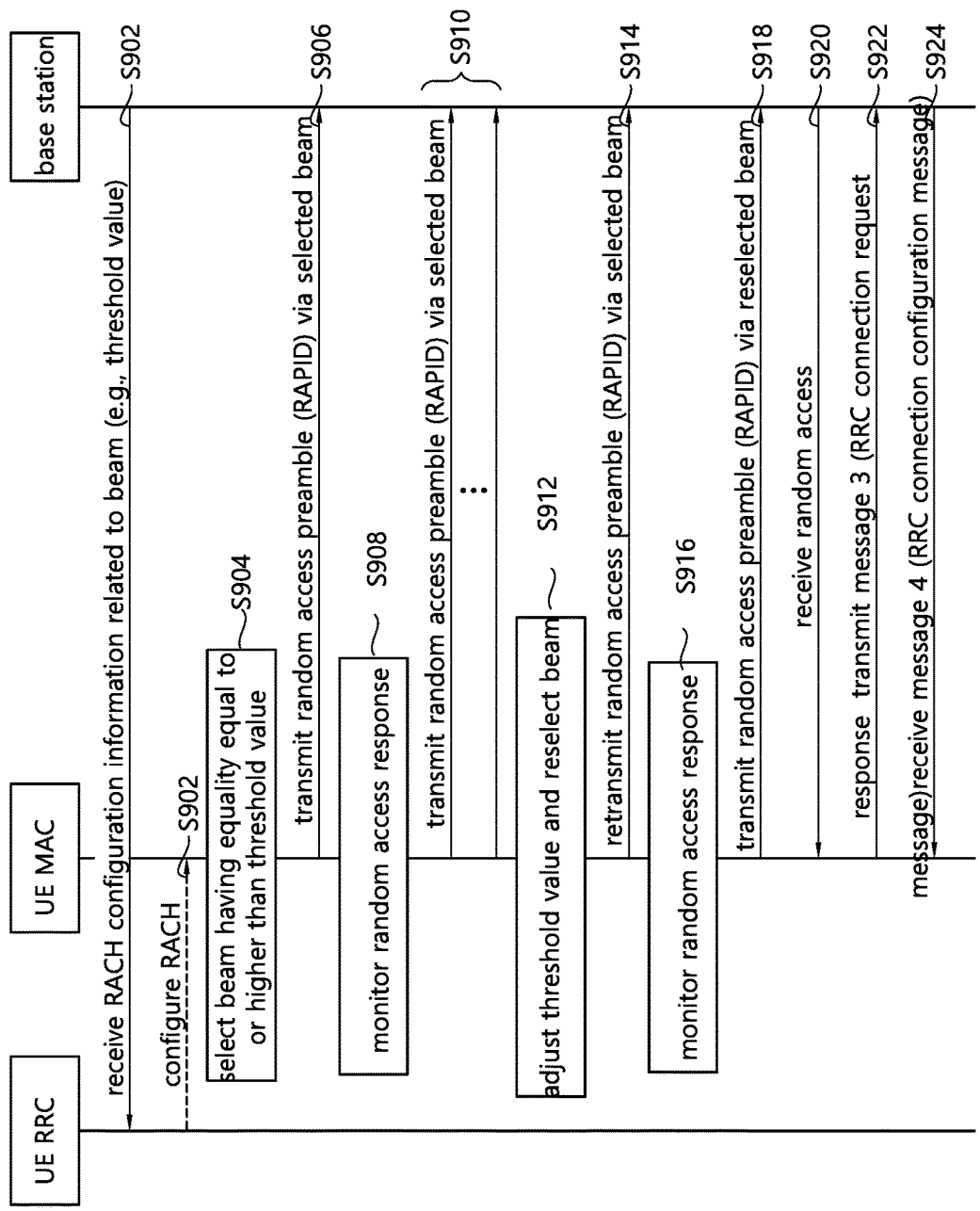
FIG. 9 shows a method of performing a random access procedure according to an embodiment of the disclosure.

Operations S904 to S924 of FIG. 9 may be performed by an MAC entity of the UE.

Figure 10:
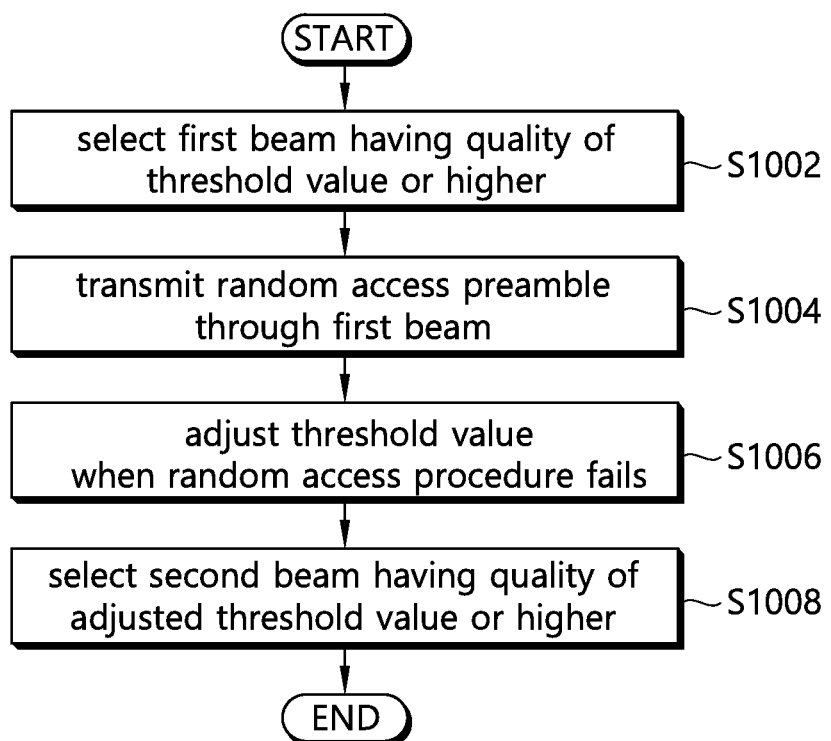
FIG. 10 is a flowchart illustrating a method of performing a random access procedure according to an embodiment of the disclosure.

FIG. 10 is a flowchart illustrating a method of performing a random access procedure according to an embodiment of the disclosure.

In operation S1002, a UE may select a first beam having a quality of a preset threshold value or higher. In operation S1004, the UE may transmit a random access preamble to a base station through the first beam. In operation S1006, if it is determined that the random access procedure fails, the UE may adjust the threshold value. In operation S1008, the UE may reselect a second beam having a quality of the adjusted threshold value or higher.

In this embodiment, the UE may transmit the random access preamble to the base station through the second beam. It may be determined that the random access procedure fails either when a response to the random access preamble is not received while the random access preamble is transmitted a set number of times or when it is determined that contention resolution is not successfully performed. The threshold value may be a reference signal received power (RSRP) value or a reference signal received quality (RSRQ) value. If the response to the random access preamble is not received, the threshold value may be adjusted by the UE reducing the threshold value. The UE may receive information about an adjustment interval for the threshold value from the base station, and the threshold value may be adjusted by adjusting the threshold value by the adjustment interval. The base station may be a base station of a target cell for handover.

Figure 11:
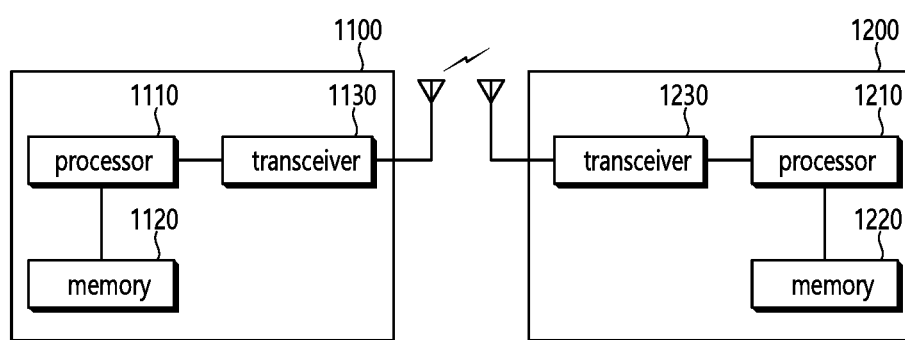
FIG. 11 shows a wireless communication system that implements an embodiment of the disclosure.

FIG. 11 shows a wireless communication system that implements an embodiment of the disclosure.

A UE 1100 includes a processor 1110, a memory 1120, and a transceiver 1130. The memory 1120 is connected to the processor 1110 and stores various pieces of information for driving the processor 1110. The transceiver 1130 is connected to the processor 1110 and transmits a radio signal to a network node 1200 or receives a radio signal from the network node 1200.

The processor 1110 may be configured to implement the functions, processes, and/or methods described herein. Specifically, the processor 1110 may control the transceiver 1130 to perform operations S902 to S924 of FIG. 9. The processor 1110 may control the transceiver 1130 to perform operations S1002 to S1008 of FIG. 10.

The network node 1200 includes a processor 1210, a memory 1220, and a transceiver 1230. The network node 1200 may be any one of an eNB, a gNB, an ng-eNB, and an en-gNB. The network node 1200 may be either an MN or an SN described above. The memory 1220 is connected to the processor 1210 and stores various pieces of information for driving the processor 1210. The transceiver 1230 is connected to the processor 1210 and transmits a radio signal to the UE 1100 or receives a radio signal from the UE 1100.

The processors 1110 and 1210 may include an application-specific integrated circuit (ASIC), another chip set, a logical circuit, a data processing device, and/or a converter converting a baseband signal and a radio signal to and from one another. The memories 1120 and 1220 may include a read-only memory (ROM), a random access memory (RAM), a flash memory, a memory card, a storage medium, and/or another storage device. The transceivers 1130 and 1230 may include a baseband circuit to process a radio frequency signal. When the embodiments are implemented in software, the above-described methods may be implemented by modules (processes, functions, or the like) performing the above-described functions. The module may be stored in the memories 1120 and 1220 and may be executed by the processors 1110 and 1210. The memories 1120 and 1220 may be located inside or outside of the processors 1110 and 1210and may be connected to the processors 1110 and 1210 through a diversity of well-known means.

Figure 12:
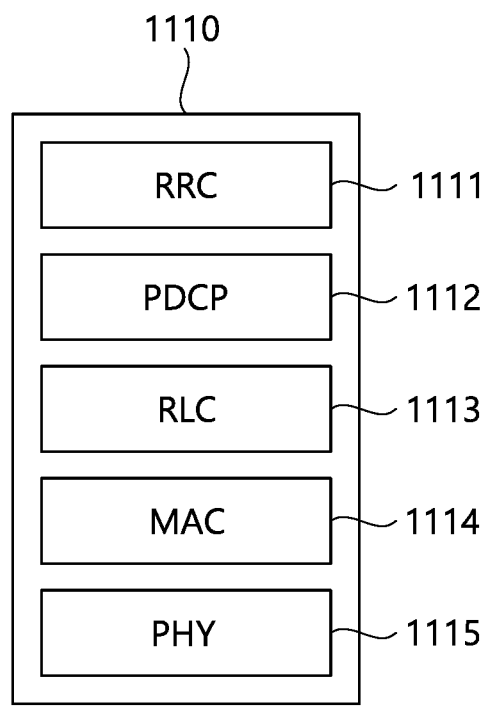
FIG. 12 shows a processor of a UE illustrated in FIG. 11.

FIG. 12 shows the processor of the UE illustrated in FIG. 11. An RRC layer 1111, a PDCP layer 1112, an RLC layer 1113, an MAC layer 1114, and a physical layer 1115 may be implemented by the processor 1110. The RRC layer 1111 may be configured to implement the functions, processes, and/or methods of the processor 1110.

Figure 13:
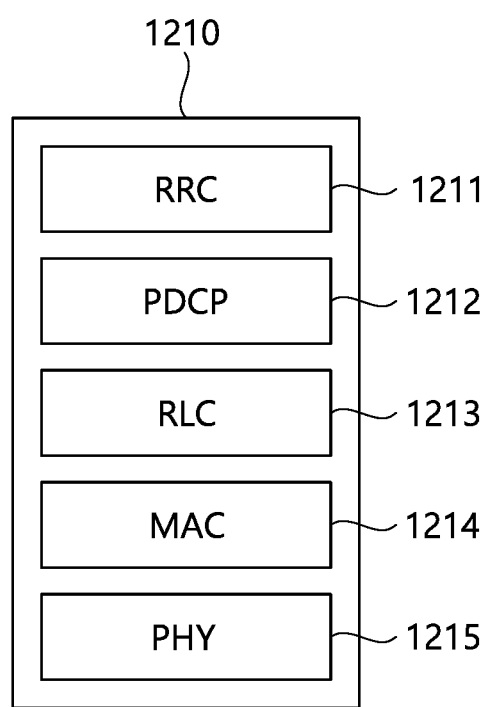
FIG. 13 shows a processor of a network node illustrated in FIG. 11.

FIG. 13 shows the processor of the network node illustrated in FIG. 11. An RRC layer 1211, a PDCP layer 1212, an RLC layer 1213, an MAC layer 1214, and a physical layer 1215 may be implemented by the processor 1210. The RRC layer 1211 may be configured to implement the functions, processes, and/or methods of the processor 1210.

In the system illustrated above, the foregoing methods that can be implemented according to the aspects of the disclosure are described on the basis of a flowchart. Although the methods are described on the basis of a series of operations or blocks for convenience, the aspects of the disclosure claimed herein are not limited to the order of the operations or blocks. Some operations or blocks may occur simultaneously or in a different order from other steps or blocks as described above. Further, those skilled in the art will understand that the operations shown in the above flowcharts are not exclusive, that further operations may be included, or that one or more operations in the flowcharts may be deleted without affecting the scope of the present disclosure.

What is claimed is:

1. A method for performing a random access procedure in a wireless communication system, the method comprising:
selecting a first beam among a plurality of beams having a quality of a first threshold value or higher;
transmitting a random access preamble to a base station through the first beam;
adjusting the first threshold value to a second threshold value due to a failure of the random access procedure;
reselecting a second beam among a plurality of beams having a quality of the second threshold value or higher; and
transmitting the random access preamble to the base station through the second beam, wherein the first threshold value is different from the second threshold value.

2. The method of claim 1, wherein the first threshold and the second threshold are signaled by a base station based on different configurations.

3. The method of claim 1, wherein it is determined that the random access procedure has failed due to the random access preamble not being received after the random access preamble has been transmitted a set number of times or due to contention resolution not being successfully performed.

4. The method of claim 1, wherein a threshold value is a reference signal received power (RSRP) value or a reference signal received quality (RSRQ) value.

5. The method of claim 1, further comprising:
receiving information about an adjustment interval from the base station,
wherein the first threshold value is adjusted to the second threshold value by the adjustment interval.

6. The method of claim 1, wherein the base station is a base station of a target cell for handover.

7. The method of claim 1, wherein the UE communicates with at least one of a mobile terminal, a network or autonomous vehicles other than the UE.

8. A user equipment (UE) configured to perform a random access procedure in a wireless communication system, the UE comprising:
a memory;
a transceiver; and
a processor operatively connected to the memory and the transceiver,
wherein the processor is configured to:
select a first beam among a plurality of beams having a quality of a first threshold value or higher;
transmit a random access preamble to a base station through the first beam;
adjust the first threshold value to a second threshold value due to a failure of the random access procedure;
reselect a second beam among a plurality of beams having a quality of the second threshold value or higher; and
transmitting the random access preamble to the base station through the second beam, wherein the first threshold value is different from the second threshold value.

9. The UE of claim 8, wherein the first threshold and the second threshold are signaled by a base station based on different configurations.

10. The UE of claim 8, wherein the processor is further configured to:
determine that the random access procedure has failed due to the random access preamble not being received after the random access preamble has been transmitted a set number of times or due to contention resolution not being successfully performed.

11. The UE of claim 8, wherein a threshold value is a reference signal received power (RSRP) value or a reference signal received quality (RSRQ) value.

12. The UE of claim 8, wherein the processor is configured to receive information about an adjustment interval from the base station and to adjust the first threshold value to the second threshold value by the adjustment interval.

13. The UE of claim 8, wherein the base station is a base station of a target cell for handover.

* * * * *